July 6, 1926.

C. WAITE

INDICATING DEVICE

Filed Oct. 19, 1925    2 Sheets-Sheet 1

1,591,448

Witness:
Alfred H. McGlinchey.

Inventor:
Charles Waite
by Van Everen Fish Hildreth & Cary
Attys.

July 6, 1926.
C. WAITE
INDICATING DEVICE
Filed Oct. 19, 1925
1,591,448
2 Sheets-Sheet 2
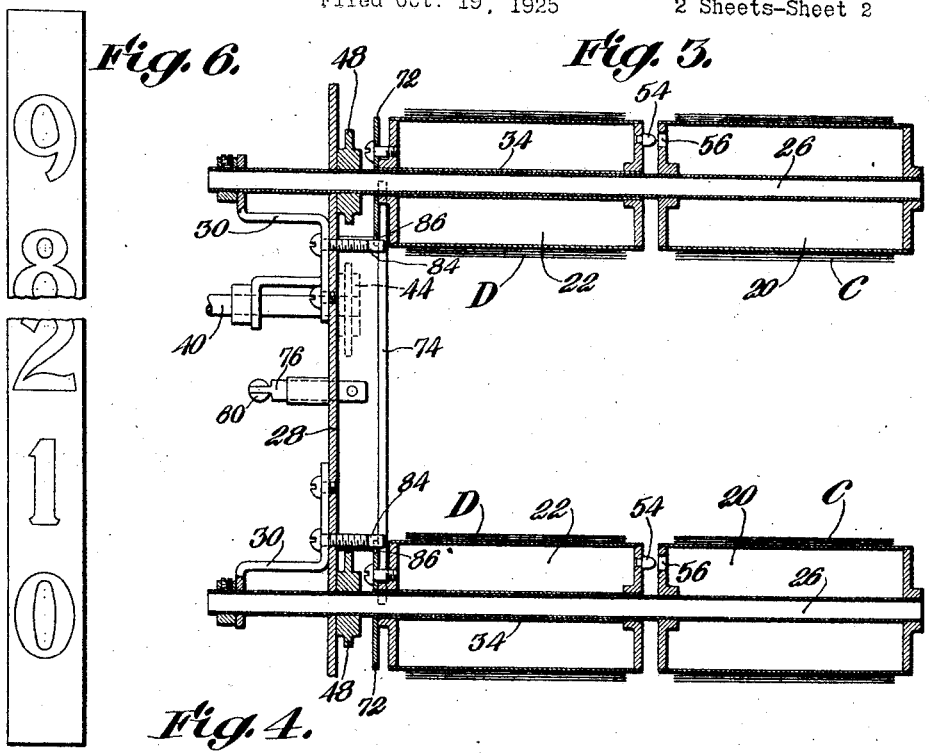
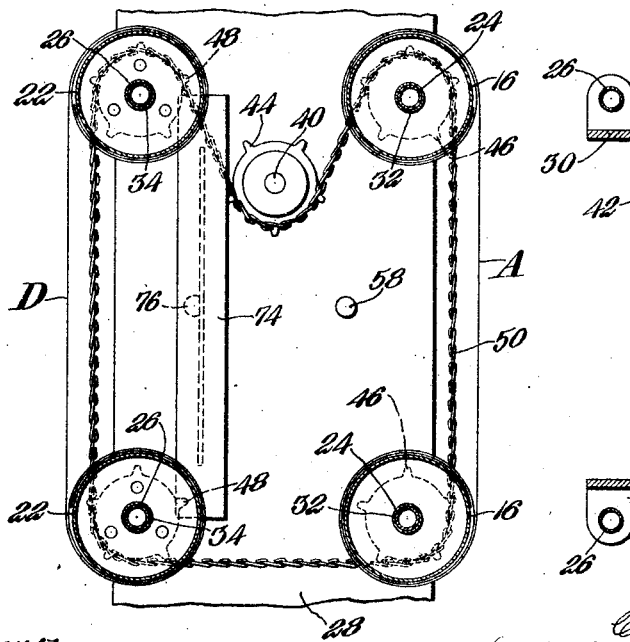
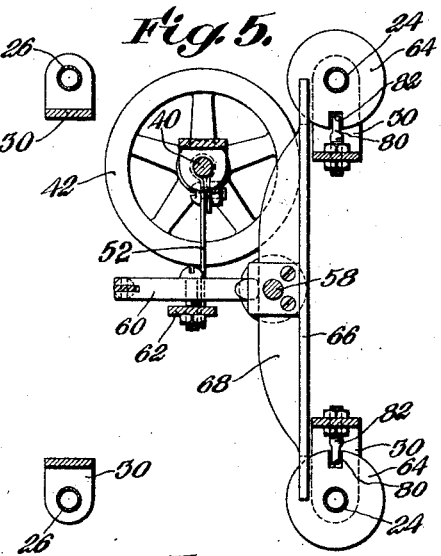
Witness:
Alfred H. McGlinchey.
Inventor:
Charles Waite
by Van Everen Fish Hildreth Heavy
Attys.

Patented July 6, 1926.

1,591,448

UNITED STATES PATENT OFFICE.

CHARLES WAITE, OF BOSTON, MASSACHUSETTS.

INDICATING DEVICE.

Application filed October 19, 1925. Serial No. 63,457.

The present invention relates to indicating or display devices, and more particularly to changeable devices for displaying selected numerals or characters.

The object of the present invention is to provide a simple and easily operated device of this general type to display a plurality of adjacent numerals or other characters, in which one or more of the characters may be selectively changed to give a desired indication.

Another object of the invention is to provide a display device to present a plurality of identical indications from different angles in which identical changes in the several indications may be simultaneously made.

With this object in view, the present invention consists in certain novel features of construction, combinations and arrangements of parts hereinafter described and particularly defined in the claims.

Figure 1:
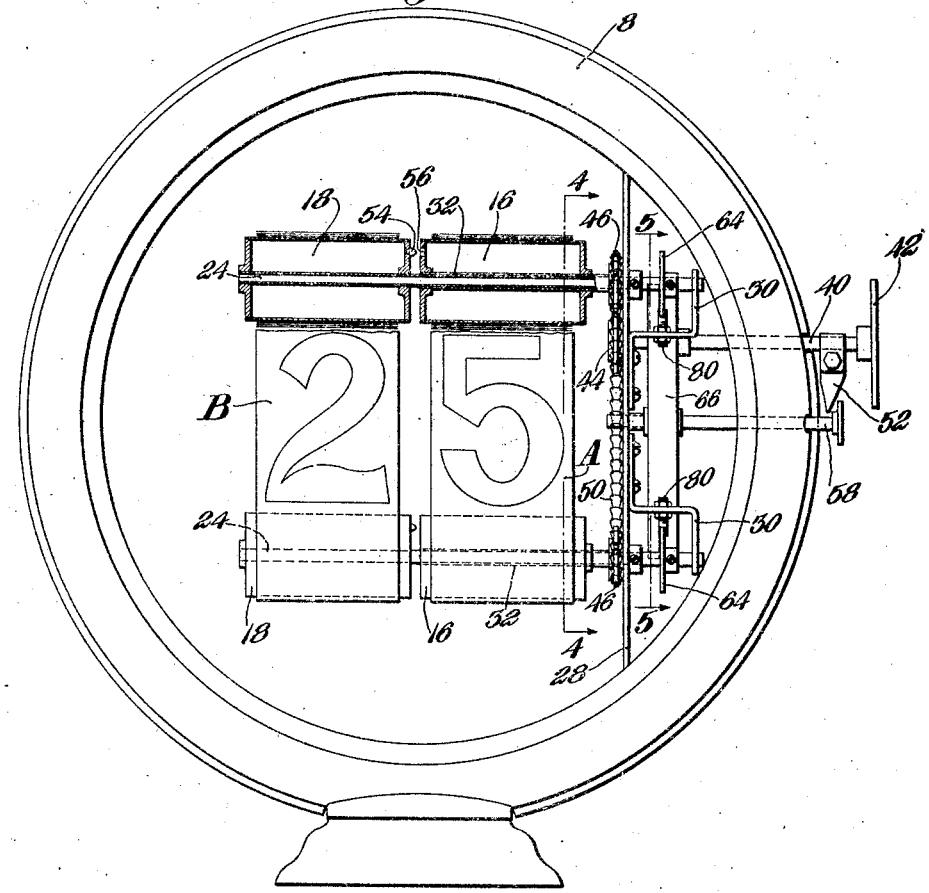
Figure 2:
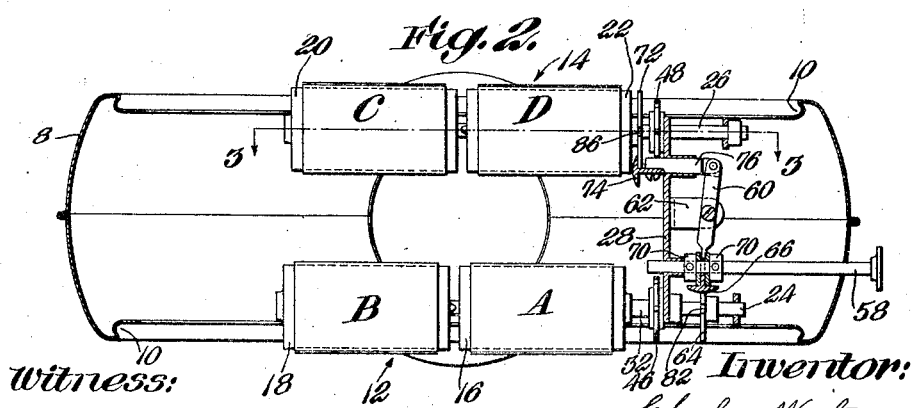

In the accompanying drawings Fig. 1 is a front elevation partly in section of an indicating device embodying the several features of the present invention; Fig. 2 is a horizontal sectional view of the device shown in Fig. 1; Fig. 3 is a section on line 3—3 of Fig. 2; Fig. 4 is a section on line 4—4 of Fig. 1; Fig. 5 is a section on line 5—5 of Fig. 1; and Fig. 6 is a detailed view of one of the webs.

The invention is herein illustrated and described as embodied in an illuminated sign to be prominently displayed for indicating the current price of a commodity. The device includes two indicators to be viewed from opposite sides, each of the indicators comprising a plurality of adjacent webs which are digitally marked and adapted to be set in a selected position with relation to one another to indicate the desired price. The web of each indicator most likely to be frequently changed upon fluctuations in price, which is ordinarily the units web, is connected with a manually operated driving means, and the other web, or webs, is adapted to be connected therewith, whereby operation of the units web alone, or of all the webs simultaneously, may be selectively determined. Corresponding webs of the two sets of indicators are simultaneously operable, so that a change in one of them effects an identical change in the other, in order that both indicators may display identical markings.

Referring to the drawings, the invention as illustrated therein comprises an indicator adapted to surmount the usual form of dispensing pump to indicate the current price of gasoline, and consists of a circular casing 8 having bezels 10 to receive the usual glass faces, and adapted to accommodate a central incandescent lamp for purposes of illumination in the usual manner. Mounted within the frame are two sets of indicators, designated generally by 12 and 14, and adapted to be displayed through the glass faces of the frame. The indicator 12 comprises two transparent or translucent webs A and B, and the indicator 14 comprises similar webs C and D, each of which is of the form indicated in Fig. 6 and provided with a series of opaque spaced digital markings. The webs A and C constitute the units webs and the webs B and D the tens webs of the respective indicators.

Each web is connected between and adapted to be wound up upon a pair of vertically separated rolls, indicated at 16, 18, 20, and 22 for the webs A, B, C, and D respectively. Each roll is of a circumference approximately equal to the distance between successive markings of the webs, so that one revolution of the roll produces a movement of one digit in the web. The left-hand pairs of rolls of each indicator, as viewed in Fig. 1, namely, the rolls corresponding to webs B and C, are supported on hollow shafts 24 and 26, which are journaled in a main bracket 28 supported in the frame 8 and a plurality of angle brackets 30, which are secured to the bracket 28. The right-hand rolls of each indicator, namely, the rolls corresponding to the webs A and D, are supported on sleeves 32 and 34 surrounding the shafts 24 and 26 respectively, and concentric therewith.

The units rolls of the indicators are adapted to be manually operated and are advanced simultaneously so that identical indications are always displayed from both of the indicators 12 and 14, and provision is also made for connecting the tens roll of each indicator with the units roll to operate the former upon rotation of the latter when a change in the tens indication is desired. The movement of the units rolls to effect movement of the webs A and C is caused by the rotation of a shaft 40 which is journaled in the casing 8 and the bracket 28, and carries at one end a hand wheel 42 and at the other a sprocket wheel 44. A similar sprocket is associated with each of the units rolls. The sprockets 46 for the indicator 12 are mounted on the sleeves 32, and the sprockets 48 for the indicator 14 on the shafts 26. A chain 50 connects all of the sprockets, so that rotation of the hand wheel 42 causes a simultaneous movement of all of the units rolls, and a consequent similar movement of both the webs A and C. A pointer 52 secured to the shaft 40 indicates rotation of the shaft through successive revolutions for consequent advancement of the web through a distance corresponding to one numerical marking.

In order to cause movement of the webs B and D, which are the tens webs of the indicators 12 and 14, the rolls 18 and 22 on which they are mounted are relatively movable on their longitudinal axes, with respect to the rolls 16 and 20 of the units webs. The shafts 24 of the indicator 12 slide within the sleeves 32, and the sleeves 34 of the indicator 14 slide upon the shafts 26. Each of the rolls 18 and 22 is provided with a projection or button 54, adapted to engage in an opening 56 in its adjacent units roll when axial movement of the tens rolls is caused to take place, thus causing simultaneous movement of all the rolls of the indicating device. The relative axial movement between the rolls is controlled by the manually operated plunger 58, which is journaled in the bracket 28 and which serves to oscillate a rock lever 60 pivoted on an angle iron 62 secured to the bracket 28. An outward movement of the plunger 58 serves to turn the rock lever 60 in a counter-clockwise direction and move the tens web B to the right and the web D to the left, as viewed in Fig. 2. For accomplishment of this purpose the shafts 24 of the indicator 12 are each provided with a disc 64, each of which is received at the end of a slotted plate 66, the plate being provided with a fin 68 secured by collars 70 on the plunger 58, and each of the rolls 22 is provided with a disc 72, which is spaced slightly away from the end of its corresponding roll to receive the plate 74, which is attached to a rod 76 pivoted at the end of the rock lever 60.

It will therefore be seen that an outward movement of the plunger 58 will effect an engaging movement of the adjacent rolls of the indicators 12 and 14, and an inward movement of the plunger will effect a separating movement of the rolls, so that the operation of the units rolls singly or of the units and tens rolls together may be selectively determined.

The friction of the various shafts and sprocket wheels is sufficient and may be relied upon to retain the units rolls of the indicators from accidental displacement. In order, however, to hold the tens rolls from displacement, especially when the units rolls are alone operated, a detent for each of the four tens rolls is provided. For the indicator 12 the detents are in the form of adjustable pins 80 received in the angle brackets 30 and projecting into notches 82 formed in the discs 64, and for the indicator 14 the detents comprise screws 84 received in the bracket 28 and projecting into notches 86 in the disc 72. It will be seen, therefore, that upon axial movement of the tens rolls to engage with the units rolls of the indicators, the respective discs are moved away from the detents to permit rotation of the rolls, while after movement of the webs to their desired position the discs again engage with the detents to restrain the rolls from accidental rotation, proper return of the discs to their respective positions being assured by the fact of the pointer being always brought to a definite angular position so as to indicate movement of the webs through definite steps corresponding to the distance between markings thereon.

While it is preferred to employ the specific construction and arrangement of parts shown and described, it will be understood that this construction and arrangement is not essential except so far as specified in the claims and may be changed or modified without departing from the broader features of the invention.

The invention having been described, what is claimed is:

1. An indicating device having, in combination, a plurality of adjacent webs, a pair of winding rolls for each web, one pair of rolls being longitudinally movable with relation to the other pair, driving means permanently connected with the last mentioned pair of rolls, means for effecting engagement of adjacent rolls to cause simultaneous rotation of all the rolls, and a detent associated with the axially movable rolls for preventing rotation of said rolls when adjacent rolls are disconnected from each other, the detent being disengaged from the rolls when the rolls are connected together for simultaneous movement.

2. An indicating device having, in combination, two adjacent marked webs, a pair of driving rolls for each web whereby different portions of the webs may be displayed, the separate webs for the two pairs being disposed on the same longitudinal axis, supporting means for the rolls comprising a shaft for each roll of one pair and a concentric sleeve for each roll of the other pair, means for rotating the supporting means of one of the pairs of rolls, means causing engagement of the separate rolls of the several pairs to permit simultaneous rotation thereof, means for relatively moving the rolls longitudinally to engage the rolls together, and a detent operating to prevent rotation of the rolls when the separate rolls of the indicators are disengaged from each other, the detent being inoperative to prevent rotation of the rolls when the rolls are engaged with each other.

3. An indicating device having, in combination, a plurality of sets of similar indicators, each indicator comprising a set of adjacent webs, winding means for each web, means for simultaneously actuating the winding means of corresponding webs of the several indicators, and a single manually operated control for selectively determining the operation of a single web or a plurality of webs of each indicator.

4. An indicating device having, in combination, a plurality of similar indicators, each indicator comprising a set of adjacent webs, winding rolls for each web, means for supporting the winding rolls of the several webs of each indicator consisting of axially movable concentric sleeves, means for simultaneously actuating the winding rolls of a single web of each indicator, a single control means for simultaneously effecting a relative axial movement between concentric sleeves of the several indicators, and means for causing engagement of adjacent winding rolls upon occurrence of such relative movement, whereby all webs of the various indicators may be simultaneously moved.

5. An indicating device having, in combination, two similar indicators, each indicator comprising a tens web and a units web provided wth digital markings, a pair of winding rolls for each web, supporting means for the rolls, means causing engagement of adjacent rolls of each indicator to permit simultaneous rotation thereof, and control means associated with the rolls of the tens webs for moving said rolls in opposite directions to effect engagement thereof with the rolls of the units webs of the respective indicators.

6. An indicating device having, in combination, a tens web and a units web arranged adjacent to each other, a pair of winding rolls for each web and separated to display one numeral only of each web, supporting means for the rolls comprising a shaft for each roll of one web and a concentric sleeve for each roll of the other web, a sprocket wheel secured to each supporting means of the rolls for the units web, a manually rotatable sprocket wheel, a chain connecting the sprocket wheels, means for effecting relative axial movement of the supporting means of adjacent rolls, and means causing engagement of adjacent rolls upon such axial movement, whereby independent movement of the units web or simultaneous movement of the units and tens webs may be selectively determined.

7. An indicating device having, in combination, a plurality of similar indicators, each indicator comprising adjacent tens and units webs, a pair of winding rolls for each web separated to display one numeral only of each web, supporting means for the rolls comprising a shaft for each roll of one web and a concentric sleeve for each roll of the other web adjacent thereto, the supporting means of adjacent rolls being relatively movable axially, a sprocket wheel secured to each supporting means of the units webs, a manually rotatable sprocket wheel, a chain connecting the sprocket wheels, means for causing simultaneous axial movement of the supporting means for the tens webs, and means causing engagement of adjacent rolls of the indicators upon such axial movement, whereby independent movement of all the units webs or simultaneous movement of all the tens and units webs may be selectively determined.

In testimony whereof I have signed my name to this specification.

CHARLES WAITE.